United States Patent [19]
Watkins

[11] Patent Number: 5,634,671
[45] Date of Patent: Jun. 3, 1997

[54] RISER CONNECTOR

[75] Inventor: Bruce J. Watkins, Houston, Tex.

[73] Assignee: Dril-Quip, Inc.

[21] Appl. No.: 693,465

[22] Filed: Aug. 2, 1996

Related U.S. Application Data

[63] Continuation of Ser. No. 283,838, Aug. 1, 1994, abandoned.

[51] Int. Cl.$^6$ .............................. F16L 55/00; F16L 37/18; F16L 39/00
[52] U.S. Cl. .................... 285/18; 285/315; 285/137.1; 285/137.2; 166/347; 166/344
[58] Field of Search ............................. 285/18, 315, 312, 285/137.1, 137.2, 81, 28, 29; 166/338, 347, 348, 344

[56] References Cited

U.S. PATENT DOCUMENTS

| | | | |
|---|---|---|---|
| 3,354,951 | 11/1967 | Savage et al. | 285/137.1 |
| 3,675,713 | 7/1972 | Watkins | 285/18 |
| 4,043,575 | 8/1977 | Roth | 285/137.2 |
| 4,097,069 | 6/1978 | Morrill | 285/137.2 |
| 4,374,595 | 2/1983 | Watkins | 285/137.2 |
| 4,453,566 | 6/1984 | Henderson, Jr. et al. | 285/137.2 |
| 4,469,136 | 9/1984 | Watkins | 285/137.2 |
| 4,491,346 | 1/1985 | Walker. | |
| 4,496,172 | 1/1985 | Walker. | |
| 4,550,936 | 11/1985 | Haeber et al. | 285/137.2 |
| 4,984,830 | 1/1991 | Saunder | 285/368 |
| 5,390,966 | 2/1995 | Cox et al. | 285/137.1 |
| 5,404,832 | 4/1995 | Hart | 285/18 |
| 5,441,311 | 8/1995 | Watkins | 285/18 |

*Primary Examiner*—Eric K. Nicholson
*Attorney, Agent, or Firm*—Vaden, Eickenroht & Thompson, L.L.P.

[57] ABSTRACT

There is disclosed a connector for releasably connecting tubular members connected to adjacent ends of riser pipes in end-to-end relation. The tubular members have locking grooves about their adjacent ends, and a split lock ring surrounds the adjacent ends of the tubular members, when in end-to-end relation, and has upper and lower teeth thereabout for fitting tightly within the grooves to hold the ends of the tubular members in end-to-end relation. The lock ring is moved between locking and unlocking positions by means of a cam ring having tapered conical cam surfaces thereabout for slidable engagement with follower surfaces about the lock ring. A support plate extends laterally from each tubular member, and pipes, which may be choke and kill/lines, one mounted on the plates to sealably interfit with one another upon movement of the tubular members into end-to-end relation. The pipes are directly locked to one another to prevent vertical separation independently of locking of the tubular members in end-to-end relation.

15 Claims, 7 Drawing Sheets

RISER CONNECTOR

This application is a continuation of application Ser. No. 08/283,836, filed Aug. 1, 1994, now abandoned.

This invention relates generally to a connector for releasably connecting riser pipes in end-to-end relation wherein a tubular member on the lower end of the upper pipe is lowered onto a tubular member on the upper end of the lower pipe and the two members then locked to one another to hold them in end-to-end relation. More particularly, it relates to improvements in connectors of this type in which the pipe ends of choke and/or kill lines extending along the sides of the riser pipes are moved into sealably engaged relation as the upper tubular member is lowered onto the lower tubular member.

In the drilling or producing of an offshore well from a floating vessel, a riser extends between the vessel and the head of the well. This riser may be as long as several thousand feet, and is made up of successive riser pipes whose adjacent ends are connected on board the vessel, as the riser is lowered into position, or disconnected on board the vessel as the riser is raised. As well-known in the art, choke and/or kill lines often extend along the side of the riser to connect with the wellhead, whereby fluids may be circulated downwardly into the wellhead for various purposes.

At one time, it was the practice to lower the riser and choke and kill lines independently of one another. It is the current practice, however, to lower them together, the pipes at the ends of the lines being fixedly carried by the tubular members at the ends of the upper and lower riser pipes so as to sealably engage one another as the upper tubular member is lowered into end-to-end relation with the lower tubular member. This requires that the tubular members be locked to one another by a connector which does not require rotation of either tubular member.

U.S. Pat. No. 4,491,346, assigned to the assignee of the present application, shows a connector especially well-suited for this purpose. Thus, as shown therein, grooves are formed about the ends of the tubular members and a split ring is carried by the upper tubular member for radial expansion and contraction. When expanded, upper and lower teeth formed about the inner diameter of the ring may be lowered with the ring into positions opposite the upper and lower grooves, and then contracted by cam means about the lock ring into locking engagement with the grooves. An improvement on the connector is shown and described in a copending application, filed by Bruce J. Watkins on Jul. 1, 1994, (now U.S. Pat. No. 5,441,311) entitled "Connector" and assigned to the assignee of the present application.

In connectors of this general type, the pipes connected to the choke and kill lines are locked against vertical separation through the locking of the tubular members to one another. It has been found, however, that the force due to the pressure of fluid within the pipes tending to separate them—the "pump-out" effect—creates large bending stress in the connector itself. This in turn has required manufacturers to build heavier and thus larger and more expensive connectors. In a marine drilling riser for a floating rig, any increase in weight is reflected many times, not only in the cost of the riser, but also in buoyant support material, dynamic support equipment, deck loading requirements, etc.

It is therefore the object of this invention to provide a riser connector in which the choke and/or kill lines are prevented from vertically separating without materially increasing the weight, size or expense of the connector.

Thus, in accordance with the novel aspects of the present invention, the sealably engaged ends of each pair of choke and/or kill line pipes are instead locked directly to one another to resist their vertical separation independently of the locking of the tubular members of the riser connector in end-to-end relation. Consequently, since the pump-out force is only a fraction of the forces on the riser itself, the pipe ends may be connected by means which is relatively light, small and inexpensive as compared with prior connectors of the type described. In the illustrated embodiment of the invention, the pipes are locked against separation by means which comprises first and second lock parts on the upper and lower pipes automatically movable into locking position with respect to one another as the ends of the pipes are moved into sealable engagement, and a third lock part shiftable into a position preventing vertical separation of the first and second lock parts when in locking position. More particularly, the first and second lock parts include slots which are aligned when they are in locking position, and the third part comprises a bolt which has been moved into the slots by a lever to prevent vertical separation of the parts.

As also illustrated, the means for locking the tubular members in end-to-end relation is similar to that shown in the aforementioned patent and pending patent application. Thus, there are shoulders about the tubular members which are tapered toward one another, and a ring for engaging the shoulders to draw them, and thus the ends of the tubular members, toward one another. More particularly, the shoulders are formed on locking grooves, and the ring is split and has first and second axially spaced locking teeth on the inner side thereof which are carried by the upper tubular member for radial movement between expanded positions in which the second teeth may be moved past the end of the lower tubular member to dispose the first and second grooves, respectively, when said members are in end-to-end relation, and contracted positions in which the first and second teeth are interlocked with the first and second grooves, respectively, and the locking means further includes cam means having slidable cam shoulders thereabout over follower surfaces about the outer side of the lock ring, and means for moving the cam means axially toward and away from a position to contract the lock ring into locking position.

In the drawings, wherein like reference characters are used throughout to designate like parts.

Figure 1:
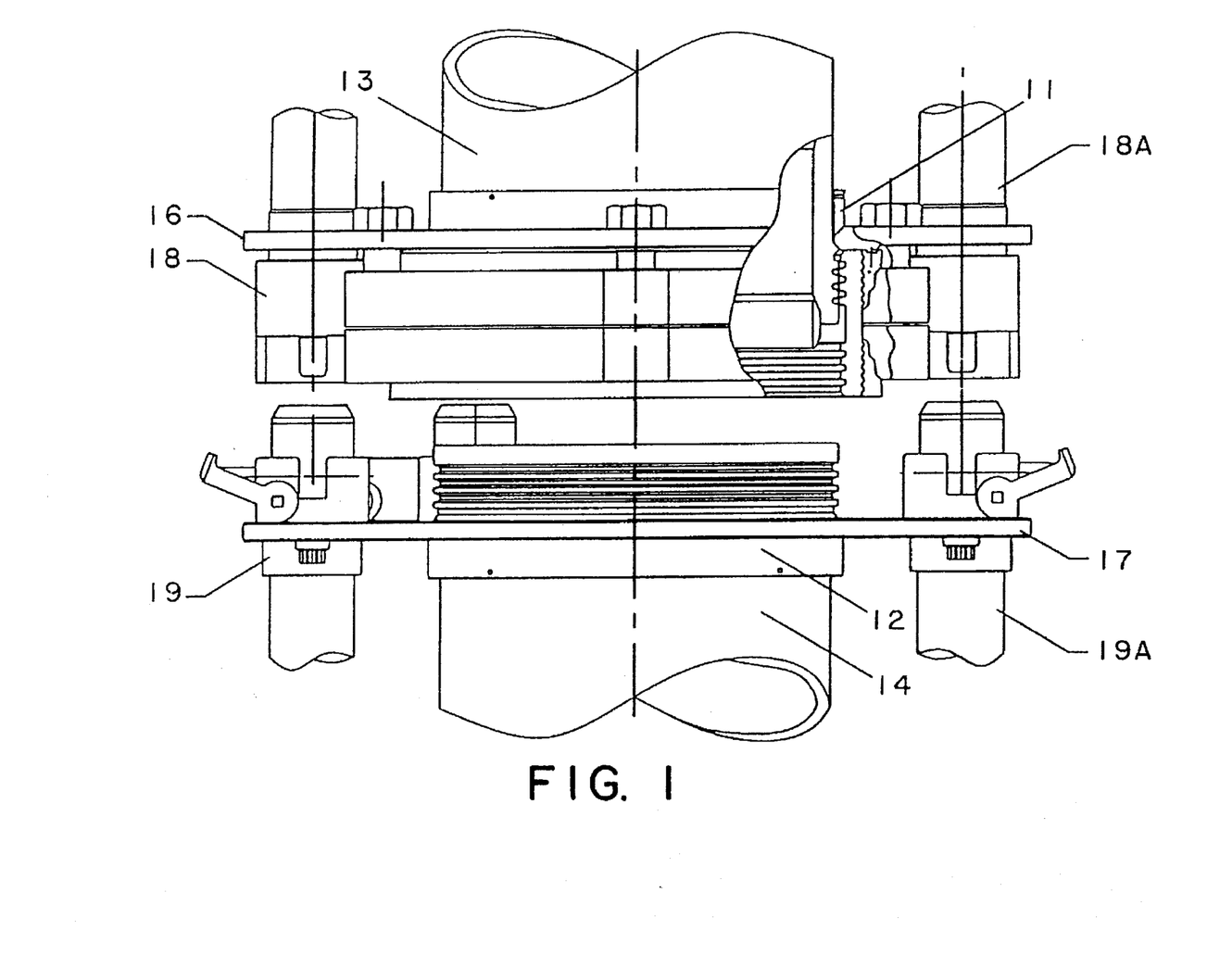
FIG. 1 is a side view of a riser connector constructed in accordance with the present invention as the upper tubular member is being lowered into end-to-end relation with the lower.
Figure 2:
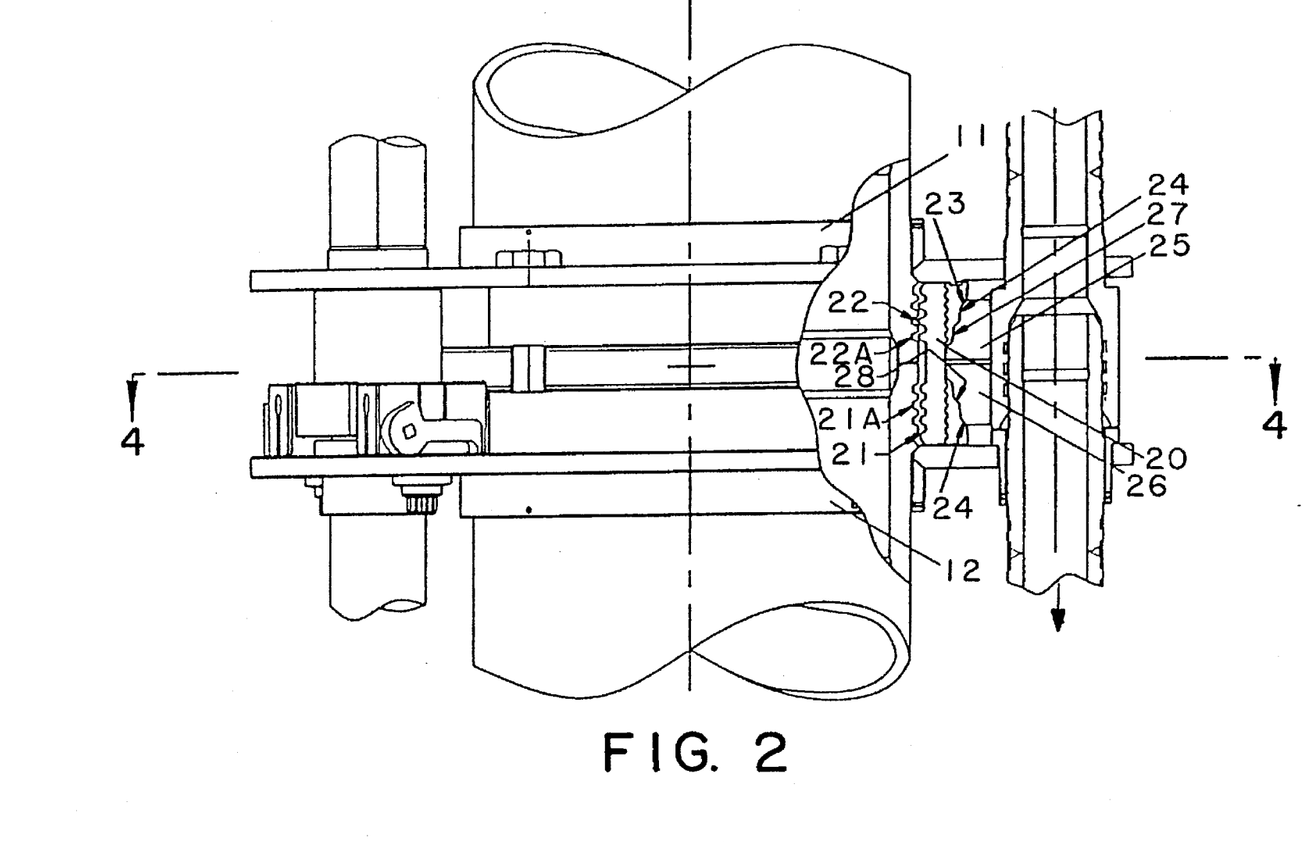
FIG. 2 is another side view of the connector, but with tubular members locked in end-to-end relation and the pipe ends sealably engaged.
Figure 3:
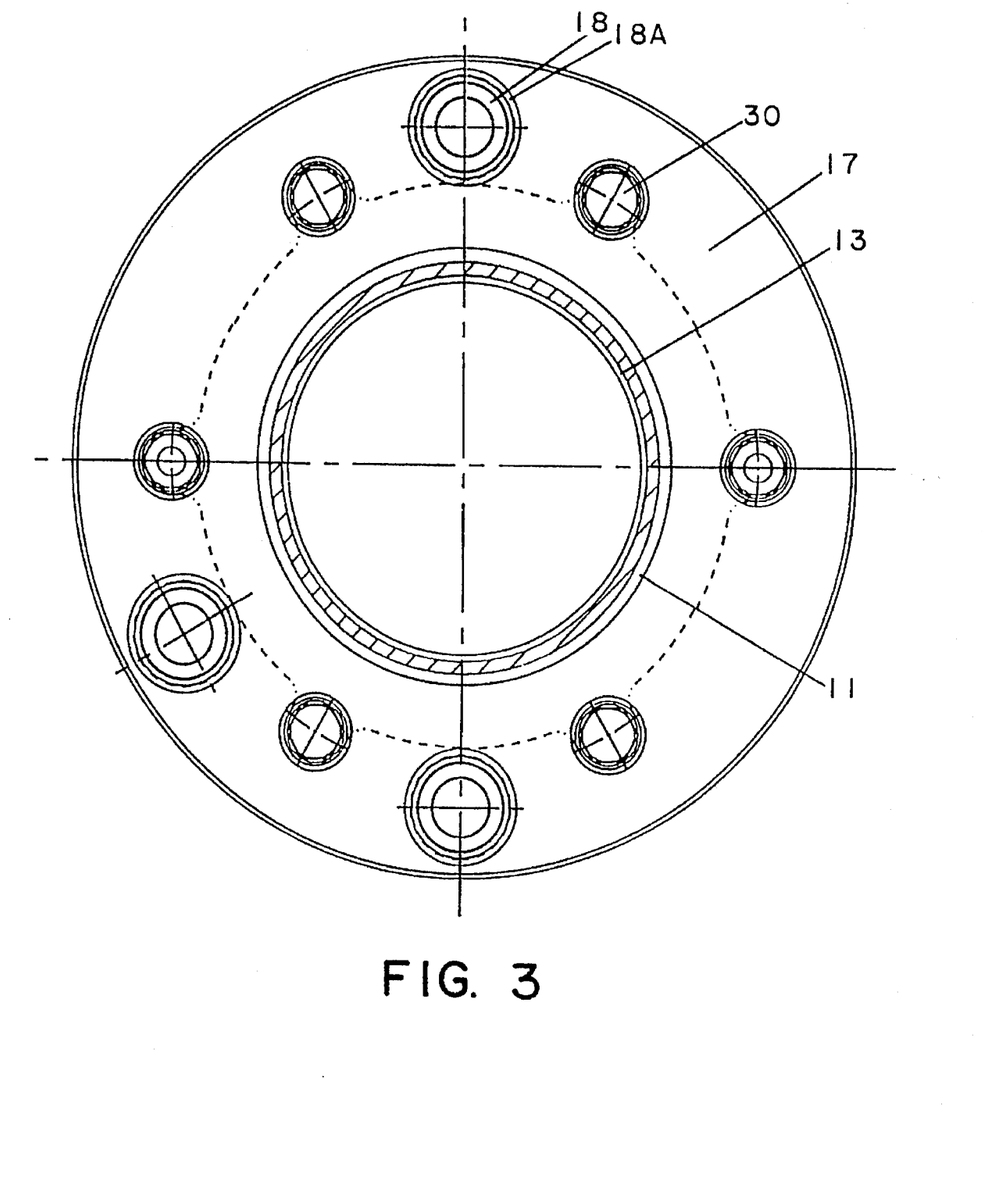
FIG. 3 is a top plan view of the connector.
Figure 4:
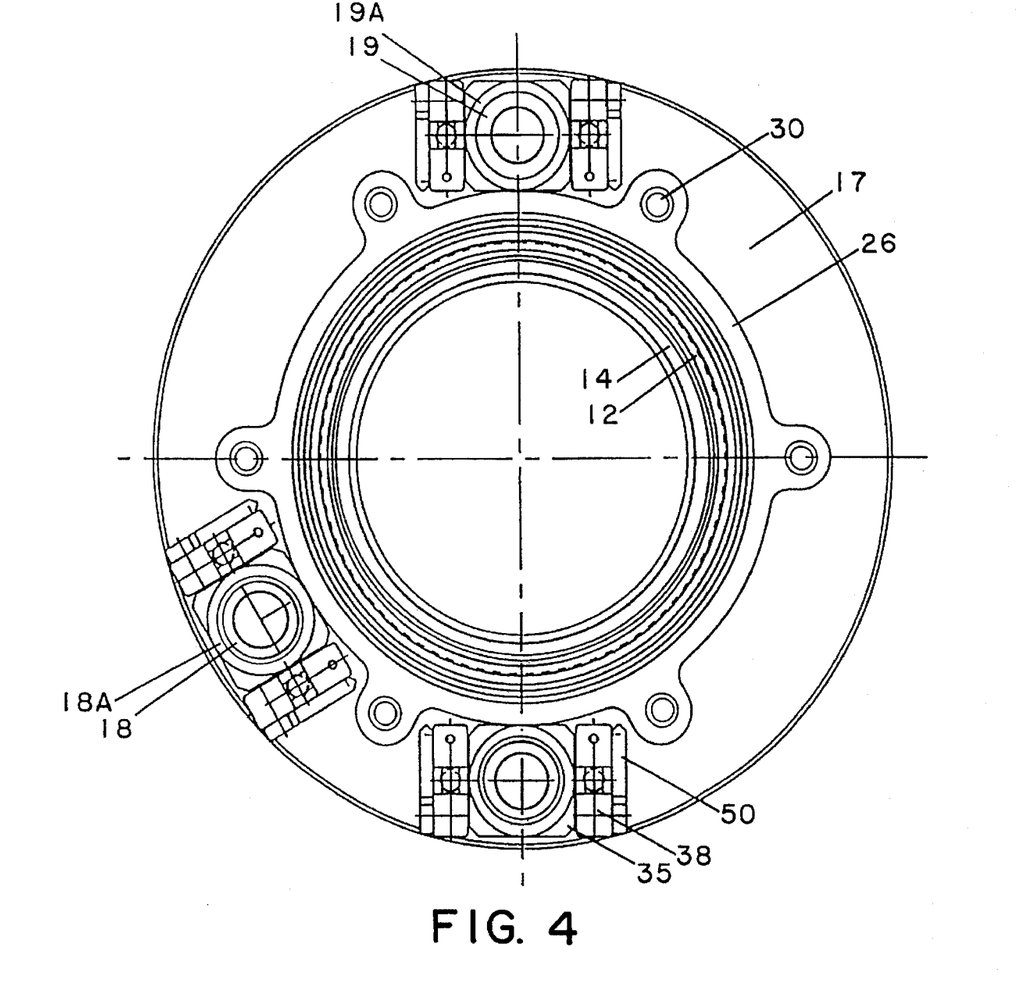
FIG. 4 is a horizontal sectional view of the riser connector, as seen along broken lines 4—4 of FIG. 2.

With reference now to the details of the above described drawings, the connector shown therein, and designated in its entirety by reference character 10, includes first and second, or upper and lower, tubular members 11 and 12, respectively, which are connected, as by welding, to the ends of upper and lower riser pipes 13 and 14, respectively. More particularly, as best shown in FIGS. 1 and 2, the tubular members are adapted to be connected in end-to-end relation so as to in turn connect the riser pipes 13 and 14 in coaxial relation, and a seal ring 15 sealably engages between tapered surfaces at the adjacent ends of the tubular members to form a smooth continuation of the bore through the connector.

A first or upper plate 16 is carried by the first or upper tubular member 11, and a second or lower plate 17 is carried by the second or lower tubular member 12. As shown, the plates extend outwardly from the tubular members so as to support the pipes 18 and 19 connected at the lower ends of the upper lines 18A and the lower lines 19A. As best shown in FIG. 2, the pipes are so supported as to move into sealed telescopic interfitting relationship as the tubular members of the connector are moved into end-to-end relation, as best shown in the broken away portion of FIG. 2. As well-known in the art, one pair of interfitting pipes may connect adjacent sections of a kill line, and the other pair may connect adjacent sections of a choke line, while additional pairs of interfitting pipes may connect adjacent sections of other types of fluid lines.

It will be understood, however, that in accordance with other embodiments of the invention, the upper and lower pipes may be integral with or otherwise fixedly carried by the upper and lower tubular members, respectively.

As also shown in the broken away portion of FIG. 2, and as shown and described in connection with the connector of both the aforementioned patent and patent application, a split lock ring 20 having upper and lower sets of teeth 21 and 22 formed about its upper and lower bore, respectively, is carried by the upper tubular member 11 for lowering therewith as well as radial movement with respect thereto. More particularly, the lock ring is carried for radial movement between an expanded position, as shown in FIG. 2, in which the lower teeth thereon are free to move downwardly over the lower tubular member 12, and a contracted position in which the teeth 21 and 22 are tightly engaged with matching grooves 21A and 22A on the tubular members 11 and 12. As previously described, the surfaces of the teeth and grooves are tapered so as to wedge the teeth tightly into the grooves as the locking ring is moved to locking position, and thus preload the riser connector by moving the ends of the tubular members axially toward one another. Obviously, when the lock ring is moved outwardly to the unlocking position shown in FIG. 2, it enables the upper tubular member 11 and thus the remainder of the upper end of the connector to be removed from the lower end thereof.

In the illustrated embodiment of the invention, the lock ring is of such construction as to normally assume its expanded or unlocking position, so that it must be forced radially inwardly to the locking position. For this purpose, conical surfaces 23 and 24 are formed about the upper and lower outer ends of the lock ring are so arranged as to be tapered toward one another. More particularly, and as disclosed in detail in the aforementioned patent application, these surfaces are surrounded by upper and lower cam rings 25 and 26, respectively, having similarly tapered surfaces 27 and 28 on their inner diameters for sliding over those of the lock ring so as to urge the lock ring inwardly to locking position as the cam rings are moved away from one another, and to move the lock ring to the expanded unlocking position when the cam rings are moved toward one another, as shown in FIG. 2.

As described in detail in the aforementioned patent application, the cam rings are adapted to be moved toward and away from one another by means of bolts 30 extending between them, with the upper ends of the bolts extending through and mounted on the upper cam ring 25 and the lower ends thereof connected to the lower cam ring by threads 31, whereby the bolts are supported by the lower cam ring and the upper cam ring is supported by the bolts. More particularly, the heads of the upper ends of the bolts may be manipulated from above the upper plate in order to move the lower cam ring upwardly or downwardly with respect to the upper cam ring.

Thus, for example, upon rotation of the bolts in a right-hand direction, the cam rings may be moved away from one another, so as to in turn cause the cam surfaces on their inner sides to slide over the cam follower surfaces on the lock ring to force the lock ring into the locking position. Alternatively, rotation of the bolts in a left-hand direction would cause the cam rings to move inwardly toward one another, as shown in FIG. 2, thus causing the follower surfaces on the cam ring to slide over the cam surfaces on the lock ring to permit the lock ring to expand outwardly to the unlocking position of FIG. 2.

Obviously, in accordance with an alternative embodiment of the invention, the cam and follower surfaces could be reversed in direction—i.e., extend in directions radially away from one another—in which event the lock ring would be moved to locking position as the cam rings were moved toward one another, and permitted to move to open or disconnected position upon movement of the cam rings away from one another. It will also be understood that, although, as shown, the lock ring is of such construction as to normally assume its expanded position, it could be otherwise—i.e., normally assume its contracted engaging position, in which case the cam rings could be so connected to the locking ring as to wedge it outwardly toward disconnected position. These alternatives would be obvious from the descriptions in the foregoing U.S. Pat. No. 4,491,346 and U.S. Pat. No. 4,496,172. Still further, the tubular members may be locked together by other well-known types of connectors such as a common union, provided that the connector may be made up without rotating the choke and kill line.

As illustrated, the pipes connected to the choke and kill lines are sealably telescopingly made up with one another merely in response to lowering of the riser pipe connector into connected position. Thus, for example, the upper plate may be lowered with the choke and kill lines to permit the lower ends of the pipes 18 to slide vertically and telescopically over and to seal with respect to the upper ends of the pipes 19. However, the ends of the pipe may be otherwise sealably engaged as they are so lowered.

Figure 5:
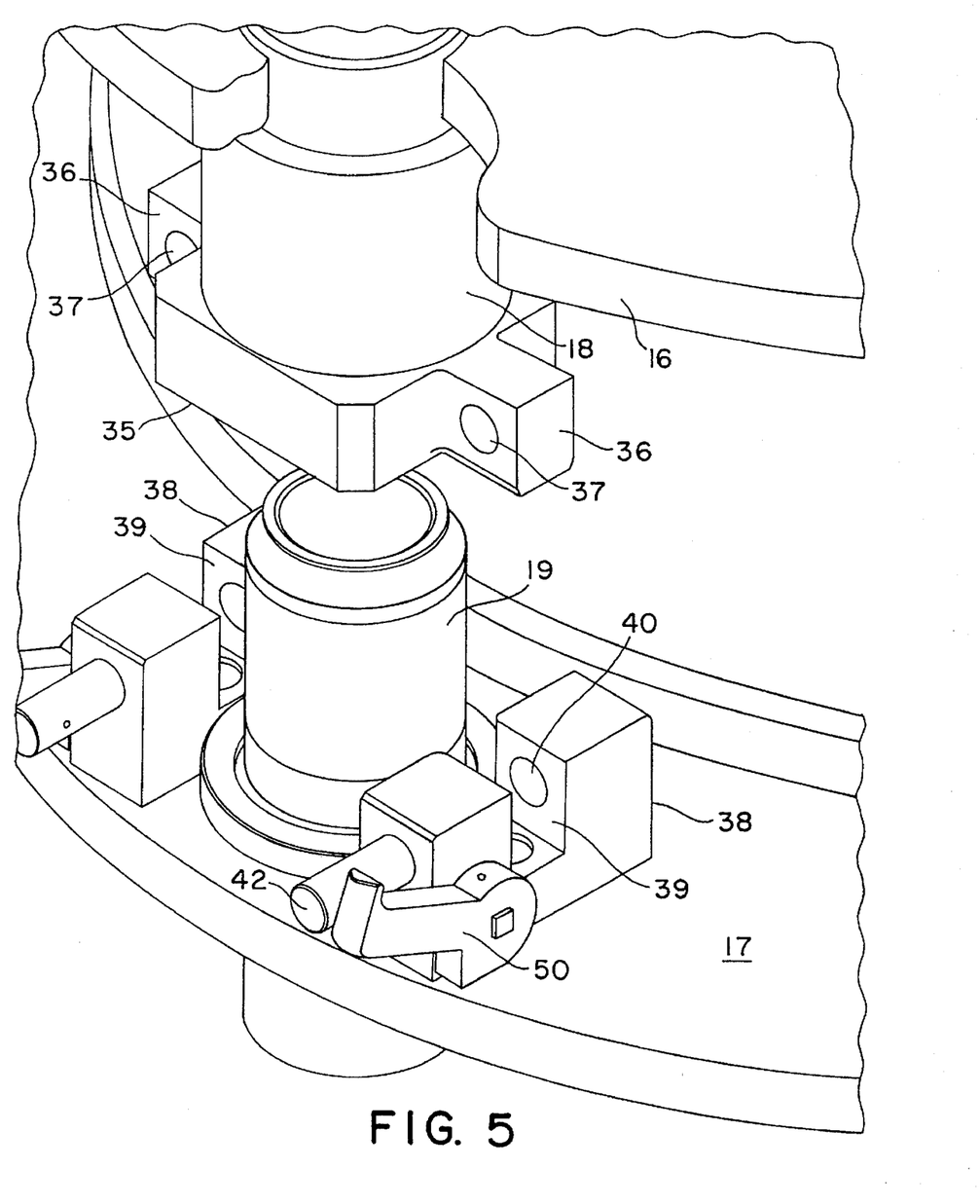
FIGS. 5, 6, and 7 are enlarged perspective views of parts carried by the upper and lower tubular members for locking the pipe ends in sealably engaged relation with FIG. 5 showing part of the upper tubular member as it is lowered toward locking position between locking parts on the lower tubular member, as in FIG. 1, FIG. 6 showing such locking part upon disposal between locking parts on the lower tubular member and with the parts connected by the bolt, and FIG. 7 showing parts broken away to illustrate the bolt which has been moved into locking position by a lever on the side of the parts.
Figure 6:
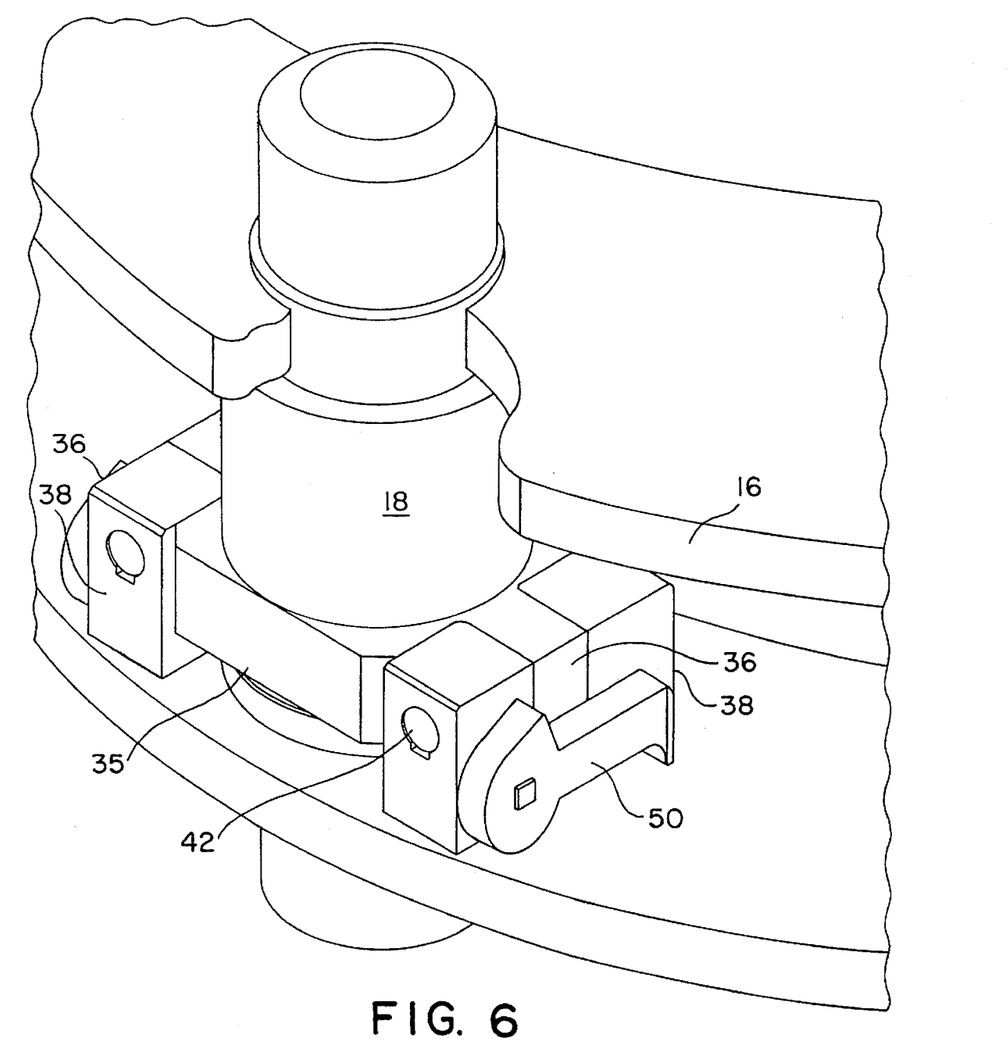
Figure 7:
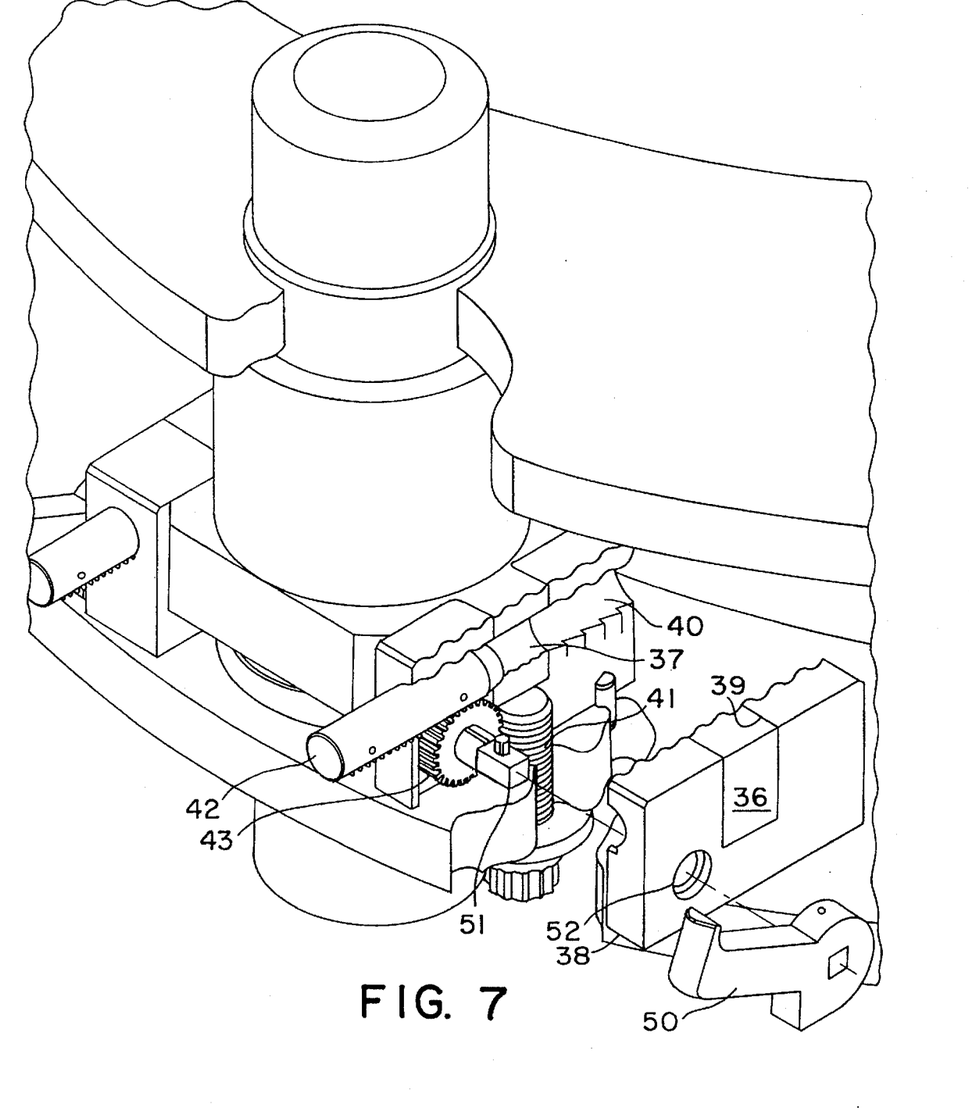

As best shown in each of the FIGS. 5, 6 and 7, a flange 35 is supported from the lower end of each of the upper pipes and has lugs 36 extending from its opposite sides. Each such lug has a hole 37 formed laterally therethrough for a purpose to be described to follow.

A pair of blocks 38 are mounted on the upper side of the lower support plate 17 on each side of the upper end of the lower pipe 19. A slot 39 is formed in each plate and is of a width to closely receive one of the lugs 36 supported from the upper pipe. Thus, as shown in FIG. 6, when the upper pipe is lowered into telescopically fitting relation with the lower pipe, the lugs fit within the slots of the blocks.

As shown in FIG. 7, the blocks also have holes 40 formed therein, each for alignment with the hole in the lug fitting between them. The hole in the lug is aligned with the holes in the block by means of a bolt 41 through the lower support plate to position its upper end at a level to engage the lower side of the lugs as the upper pipe is lowered onto the pipe.

The holes 40 in the blocks are adapted to receive a grooved bolt 42 which, as the lugs are moved between the blocks, is in a retracted position within the left hand block, as shown in FIG.7. When the holes in the lug are aligned with the holes in the block, the bolt is adapted to be moved through the hole 37 in the lug and into the opposite hole 40 in the block by means of a gear 43 rotatably mounted on the left hand block to cause its gears to engage the grooves on the bolt above it, such that rotation of the gear in one direction will move the bolt into locking relation with respect to the lug, while rotation in the opposite direction will move the lug to the unlocking position of FIGS. 5 and 7.

The gear is rotated between locking and unlocking positions by means of a lever 50 connected to an out of round end of a shaft 51 on the gear which extends through a hole 52 in the left hand side of the block. Thus, the lever need only be rotated from the position of FIG. 5 to the position of FIG. 6 to move the bolt into locking position. In both positions, surfaces on the lever engage the top side of the lower support plate to prevent further rotation of movement of the lever.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A riser pipe connector, comprising
upper and lower tubular riser members adapted to be connected to the, ends of upper and lower riser pipe elements, respectively,
means including interengageable locking parts on the upper and lower riser members which are operable, upon lowering of the lower end of the upper riser member onto the upper end of the lower riser member, for locking said riser members in end-to-end relation without rotation of either member,
a pipe fixedly carried by each riser member for movement into sealed engagement with a pipe carried by the other riser member, upon movement of the riser members into end-to-end relation, and
means including parts on the pipes for locking them in engagement with one another to prevent vertical separation of the pipes.

2. As in claim 1, wherein
there are a plurality of pipes carried by each riser member for sealably engaging a pipe carried by the other riser member, and
a means is provided for locking each pair of pipes against vertical separation.

3. As in claim 1, wherein
said means for locking the pipes comprises first and second locking parts on the upper and lower pipes, respectively, automatically movable into locking position with respect to one another as the pipes are moved into engagement, and
a third locking part shiftable into a position preventing vertical separation of the first and second locking parts.

4. As in claim 3, wherein
the first and second locking parts include slots which are aligned when the pipes are in locking position, and
the third part comprises a bolt slidable within the slots to prevent vertical separation.

5. As in claim 1, wherein
the means for locking the tubular riser member in end-to-end relation comprises
shoulders about the riser members which are tapered toward one another, and
a ring for engaging the shoulders to draw them, and thus the ends of the riser members, toward one another.

6. As in claim 5, wherein
the shoulders are formed on locking grooves, and
the ring is split and has first and second axially spaced locking teeth on the inner side thereof which are carried by the upper riser member for radial movement between expanded positions in which the second teeth may be moved past the end of the lower riser member to dispose the first and second teeth opposite the first and second grooves, respectively, when said riser members are in end-to-end relation, and contracted positions in which the first and second teeth are interlocked with the first and second grooves, respectively, and
said means for locking said riser members further includes cam means having cam slidable shoulders thereabout which are slidable over follower surfaces about the outer side of the ring, and means for moving the cam means axially toward and away from a position to contract the ring into locking position.

7. As in claim 5, wherein
the ends of the pipes are moveable into telescoping relation prior to being locked to one another.

8. As in claim 5, comprising
an upper support plate extending laterally of the upper riser member, and
a lower support plate extending laterally of the lower riser member,
the upper and lower pipes being mounted, respectively, on the upper and lower pipes.

9. A riser pipe connector, comprising
upper and lower tubular riser members adapted to be connected to the ends of upper and lower riser pipe elements, respectively
means including interengageable locking parts on the upper and lower riser members which are operable, upon lowering of the lower end of the upper riser member onto the upper end of the lower riser member, for locking said members in end-to-end relation,
a pipe carried by each riser member for movement into sealed engagement with a pipe carried by the other riser member, upon movement of the riser members into end-to-end relation, and
means including parts on the pipes for locking them in engagement with one another to prevent vertical separation of the pipes.

10. As in claim 9, wherein
there are a plurality of pipes carried by each riser member for sealably engaging a pipe carried by the other riser member, and
a means is provided for locking each pair of pipes against vertical separation.

11. As in claim 9, wherein
said means for locking the pipes comprises first and second locking parts on the upper and lower pipes, respectively, automatically movable into locking position with respect to one another as the pipes are moved into engagement, and a third locking part shiftable into a position preventing vertical separation of the first and second locking parts.

12. As in claim 11, wherein the first and second locking parts include slots which are aligned when the pipes are in locking position, and the third part comprises a bolt slidable within the slots to prevent vertical separation.

13. As in claim 9, wherein the means for locking the riser members in end-to-end relation comprises shoulders about the riser members which are tapered toward one another, and a ring for engaging the shoulders to draw them, and thus the ends of the riser members, toward one another.

14. As in claim 13, wherein the shoulders are formed on locking grooves, and the ring is split and has first and second axially spaced locking teeth on the inner side thereof which are carried by the upper riser member for radial movement between expanded positions in which the second teeth may be moved past the end of the lower riser member to dispose the first and second teeth opposite the first and second grooves, respectively, when said riser members are in end-to-end relation, and contracted positions in which the first and second teeth are interlocked with the first and second grooves, respectively, and said means for locking said riser members further includes cam means having cam slidable shoulders thereabout which are slidable over follower surfaces about the outer side of the ring, and means for moving the cam means axially toward and away from a position to contract the ring into locking position.

15. As in claim 9, wherein the ends of the pipes are moveable into telescopic relation prior to being locked to one another.

\* \* \* \* \*

UNITED STATES PATENT AND TRADEMARK OFFICE
CERTIFICATE OF CORRECTION

PATENT NO. : 5,634,671
DATED : June 3, 1997
INVENTOR(S) : Bruce J. Watkins

It is certified that error appears in the above-indentified patent and that said Letters Patent is hereby corrected as shown below:

Title page,
In the Abstract:
                line 14, change "one mounted" to --are mounted--.

Col. 3, line 55, change "are" to --and--.
Col. 5, line 38, cancel the comma after "the".
Col. 6, line 41, change "pipes" to --plates--.

Signed and Sealed this

Twenty-eighth Day of October, 1997

Attest:

BRUCE LEHMAN

*Attesting Officer*     *Commissioner of Patents and Trademarks*